United States Patent
Dakroub

[11] Patent Number: 5,999,348
[45] Date of Patent: Dec. 7, 1999

[54] DATA STORAGE SYSTEM HAVING BASELINE SHIFT CORRECTION

[75] Inventor: Housan Dakroub, Oklahoma City, Okla.

[73] Assignee: Seagate Technology, Inc., Scotts Valley, Calif.

[21] Appl. No.: 08/884,933

[22] Filed: Jun. 30, 1997

Related U.S. Application Data

[60] Provisional application No. 60/040,760, Mar. 14, 1997.
[51] Int. Cl.⁶ ...................................................... G11B 5/09
[52] U.S. Cl. ............................................................. 360/46
[58] Field of Search .......................................... 360/46, 65

[56] References Cited

U.S. PATENT DOCUMENTS

| | | | |
|---|---|---|---|
| 4,694,468 | 9/1987 | Cullum | 375/224 |
| 5,367,409 | 11/1994 | Ottesen et al. | 360/46 |
| 5,638,226 | 6/1997 | Koren | 360/65 |
| 5,701,314 | 12/1997 | Armstrong et al. | 371/40.3 |
| 5,739,972 | 4/1998 | Smith et al. | 360/78.11 |

*Primary Examiner*—Nabil Hindi
*Assistant Examiner*—Regina Y. Neal
*Attorney, Agent, or Firm*—Westman, Champlin & Kelly, P.A.

[57] ABSTRACT

A data storage apparatus is provided in which a transducer provides a read back signal. A baseline shift correction network, operably coupled to the transducer, removes baseline shift from the read back signal and provides a corrected read back signal. In addition, a disc drive utilizing baseline shift compensation circuitry is disclosed.

10 Claims, 4 Drawing Sheets

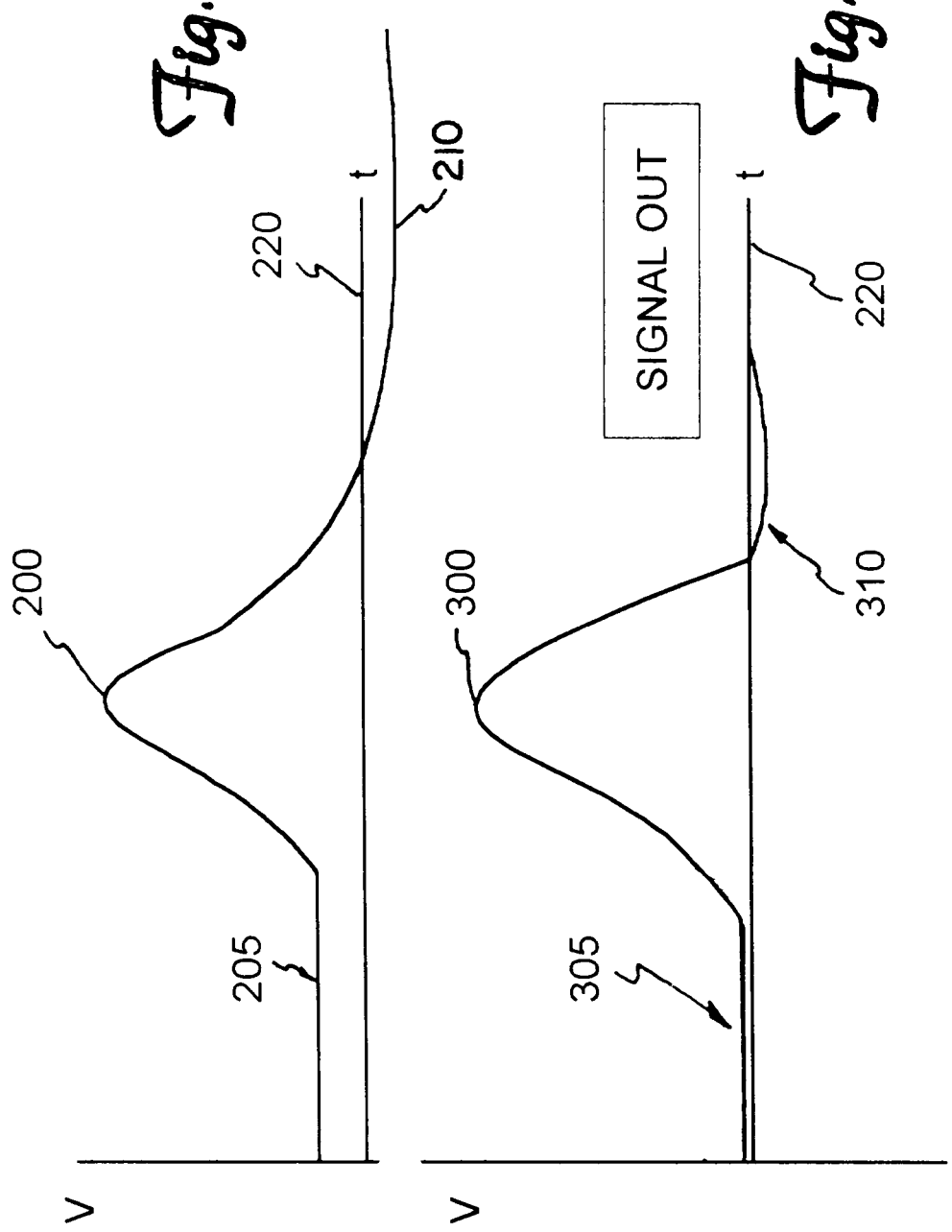

DATA STORAGE SYSTEM HAVING BASELINE SHIFT CORRECTION

The present application claims the benefit of earlier filed U.S. Provisional Application Ser. No. 60/040,760, entitled BASELINE SHIFT CORRECTING NETWORK, filed on Mar. 14, 1997.

FIELD OF THE INVENTION

The present invention relates generally to data storage systems. More particularly, the present invention relates to a disc drive data storage system having a network for correcting baseline shift in the read back signal.

BACKGROUND OF THE INVENTION

In disc drives, digital data are written to and read from a thin layer of magnetizable material on a surface of one or more rotating discs. Write and read operations are performed through a transducer which is carried in a slider body. The slider and transducer are sometimes collectively referred to as a head, and typically a single head is associated with each disc surface. When the transducer is a magnetoresistive (MR) type sensor, the combination of the slider and the transducer are frequently referred to as an MR head. The heads are selectively moved under the control of electronic circuitry to any one of a plurality of circular, concentric data tracks on the disc surface by an actuator device.

The transducer of an MR head provides a read back signal, indicative of the data read from the disc surface, to a preamplifier circuit. After amplification by the preamplifier, the read back signal is provided to a channel integrated circuit (IC) of the disc drive. The channel IC detects transition levels in the read back signal and provides an output signal which is indicative of the data states of the individual bits in the read back signal data stream, and thereby of data stored on the disc surface. An example of a channel IC is the IC device sold by Silicon Systems Incorporated under the product number SSI 4911C.

A phenomena associated with MR heads is baseline shift in the read back signal. Baseline shift is a low frequency problem which cannot be corrected by channel ICs such as the SSI 4911C. Baseline shift is the shift of the steady state value of the read back signal to values above and/or below the intended baseline, which is typically 0 volts. Baseline shift renders it difficult for the channel IC to detect levels in the read back signal. Attempts to compensate for baseline shift using software algorithms have proven to be difficult and costly to implement. Further, compensating for baseline shift in the read back signal can be a complex task since the read back signal can have a wide range of frequencies (i.e., can represent a wide range of data rates).

The present invention provides a solution to this and other problems, and offers other advantages over the prior art.

SUMMARY OF THE INVENTION

The present invention relates to data storage systems and apparatus, such as disc drive data storage systems, which include a correction network adapted to remove baseline shift from the read back signal.

In accordance with one embodiment of the invention, a data storage apparatus is provided in which a transducer provides a read back signal. The read back signal is provided to a correction network which removes baseline shift from the read back signal and provides as an output a corrected read back signal.

These and various other features as well as advantages which characterize the present invention will be apparent upon reading of the following detailed description and review of the associated drawings.

BRIEF DESCRIPTION OF THE DRAWINGS

FIG. 2 is a plot illustrating a read back signal, exhibiting baseline shift, which is provided as an input to the baseline shift correction network in preferred embodiments of the present invention.

FIG. 3 is a plot illustrating the read back signal provided as an output by the baseline shift correction network and having baseline shift substantially removed.

DETAILED DESCRIPTION OF THE PREFERRED EMBODIMENTS

Figure 1:
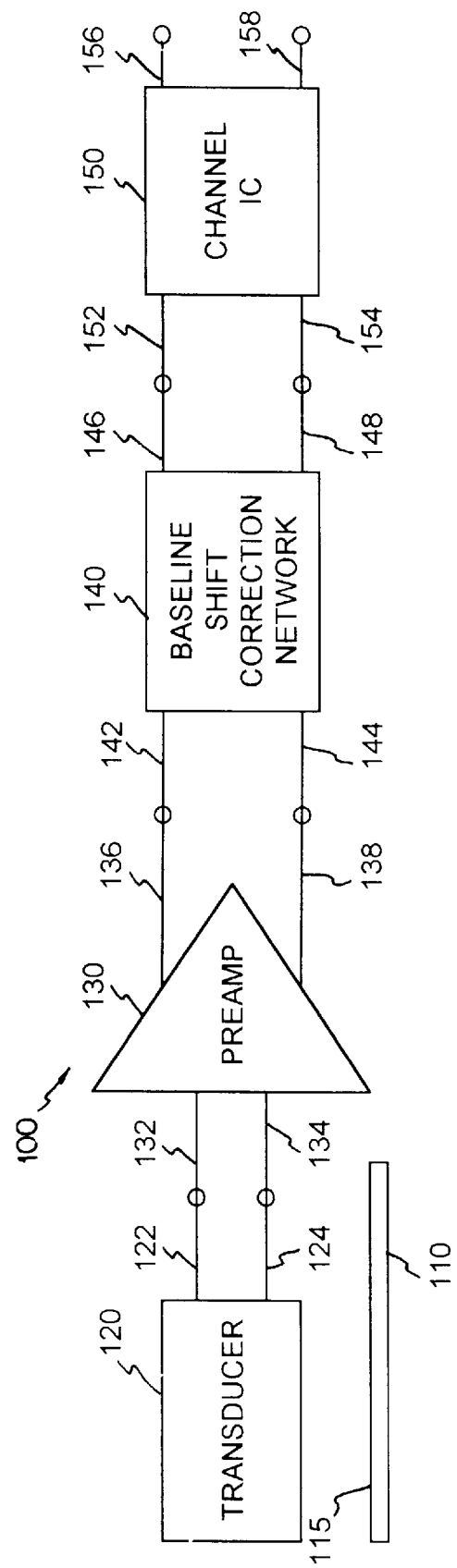
FIG. 1 is a block diagram of a data storage system which has a baseline shift correction network in accordance with the preferred embodiments of the present invention.

Referring now to FIG. 1, data storage system or apparatus 100 is shown. In preferred embodiments, data storage system 100 is a magnetic disc drive data storage system of the type having magnetoresistive (MR) transducers. However, data storage system 100 can be other types of data storage systems such as an inductive transducer magnetic storage system or an optical transducer data storage system.

Data storage systems and apparatus like the one shown in FIG. 1 include data storage media 110, transducer 120, preamplifier 130, baseline shift correction network 140 and channel integrated chip (IC) 150. Data storage media 110 can be, for example, a magnetic storage disc having data stored on surface 115. Transducer 120 is positionable adjacent surface 115 of media 110 for reading data stored on surface 115. In preferred embodiments in which data storage system 100 is a disc drive data storage system, transducer 120 is preferably an MR transducer mounted on the slider body (not shown) of a head slider. Transducer 120 provides a differential read back signal, across outputs 122 and 124, which is indicative of the values or data states of individual bits of data stored on surface 115.

Preamplifier 130 can be any of a variety of amplifier circuits, such as an operational amplifier functioning in a differential mode. Preamplifier 130 has differential inputs 132 and 134 and differential outputs 136 and 138. Inputs 132 and 134 of preamplifier 130 are operably coupled to outputs 122 and 124 of transducer 120. Preamplifier 130 receives the differential read back signal from transducer 120 and provides an amplified version of the read back signal across outputs 136 and 138.

Baseline shift correction network 140 has differential inputs 142 and 144 and differential outputs 146 and 148. Differential inputs 142 and 144 of baseline shift correction network 140 are operably coupled to differential outputs 136 and 138, respectively, of preamplifier 130. Baseline shift correction network 140 removes or reduces baseline shift in the amplified read back signal, and provides a corrected read back signal across differential outputs 146 and 148. Two specific embodiments of baseline shift correction network 140 are discussed below in detail with reference to FIGS. 2 and 3.

Channel IC 150 includes differential inputs 152 and 154 and differential outputs 156 and 158. Channel IC 150 is an IC device of the type well known in the data storage industry which receives a read back signal and determines from the transition levels in the read back signal what values (i.e., "1s" and "0s") are represented by the individual bits of the read back signal. An example of a channel IC which can be used in data storage system 100 is the channel IC sold by Silicon Systems Incorporated under the product number SSI 4911C.

Inclusion of baseline shift correction network 140 in data storage system 100 greatly reduces read back errors which are common with channel ICs, such as the SSI 4911C, which train and make decisions on portions of the read back signal which occur near the baseline voltage level. Read back of servo signals will also be improved. The removal of baseline shift in the read back signal by correction network 140 is particularly advantageous since channel ICs typically cannot control low frequency signals where baseline shift equalization and correction is needed.

Baseline shift correction network 140 removes baseline shift from the read back signal by applying the Laplace transform transfer function shown in Equation 1 to the read back signal.

Equation 1

$$H(s) = \frac{S}{S + (3 \cdot 10^6)} \cdot \frac{S + (A \cdot 10^6)}{S + (B \cdot 10^6)}$$

where

A=a variable having a value between about 10 and about 50.

B=a variable having a value between about 1 and about 10.

The first term of the transfer function shown of Equation 1, $(S \div (S+(3 \cdot 10^6)))$, corresponds to the original coupling zero and pole included in prior art disc drive data storage systems (corresponding to the coupling capacitors between the preamplifier and channel IC and the input resistance of the channel IC). It has been found that for channel ICs such as the SSI 4911C, this term should be included in the transfer function applied to the read back signal. However, for other channel ICs, this term can be omitted. It has also been found that, in the second term of equation 1, a preferred value of variable A is 16, while a preferred value of the variable B is 6. However, it should be understood that variables A and B can have a range of values selected for the particular characteristics of the data storage system.

FIG. 2 is a plot illustrating amplified read back signal 200 which, when referring to data storage system 100 illustrated in FIG. 1, is provided to baseline shift correction network 140. The plot of FIG. 2 illustrates the voltage of the read back signal versus time. As can be seen in FIG. 2, baseline shift has shifted leading edge portion 205 of signal 200 to a value above baseline 220. The baseline shift phenomena has also shifted trailing edge portion 210 of amplified read back signal 200 to a value which is significantly below baseline 220.

FIG. 3 is a plot illustrating corrected read back signal 300 which, referring to data storage system 100 illustrated in FIG. 1, corresponds to the signal provided as an output by baseline shift correction network 140 across outputs 146 and 148. The plot of FIG. 3 is of the voltage of the corrected read back signal versus time. Corrected read back signal 300 is therefore obtained by applying the transfer function shown in Equation 1 to feedback signal 200. As can be seen in FIG. 3, leading edge portion 305 of signal 300 is substantially equal to baseline 220. Trailing edge portion 310 of corrected read back signal 300 has the baseline shift substantially removed such that this portion of signal 300 is only slightly below the intended signal baseline 220.

It has been found that, by applying the transfer function shown in Equation 1, baseline shift correction network 140 can remove baseline shift from the read back signal at virtually all data rates or frequencies of the read back signal. This is highly advantageous over the prior art in that no changes are necessary in correction network 140 as different zones of media surface 115 are read at different data rates. This observation of baseline shift properties permits correction network 140 to be implemented using relatively inexpensive circuits such as the ones discussed below with reference to FIGS. 4 and 5.

Figure 4:
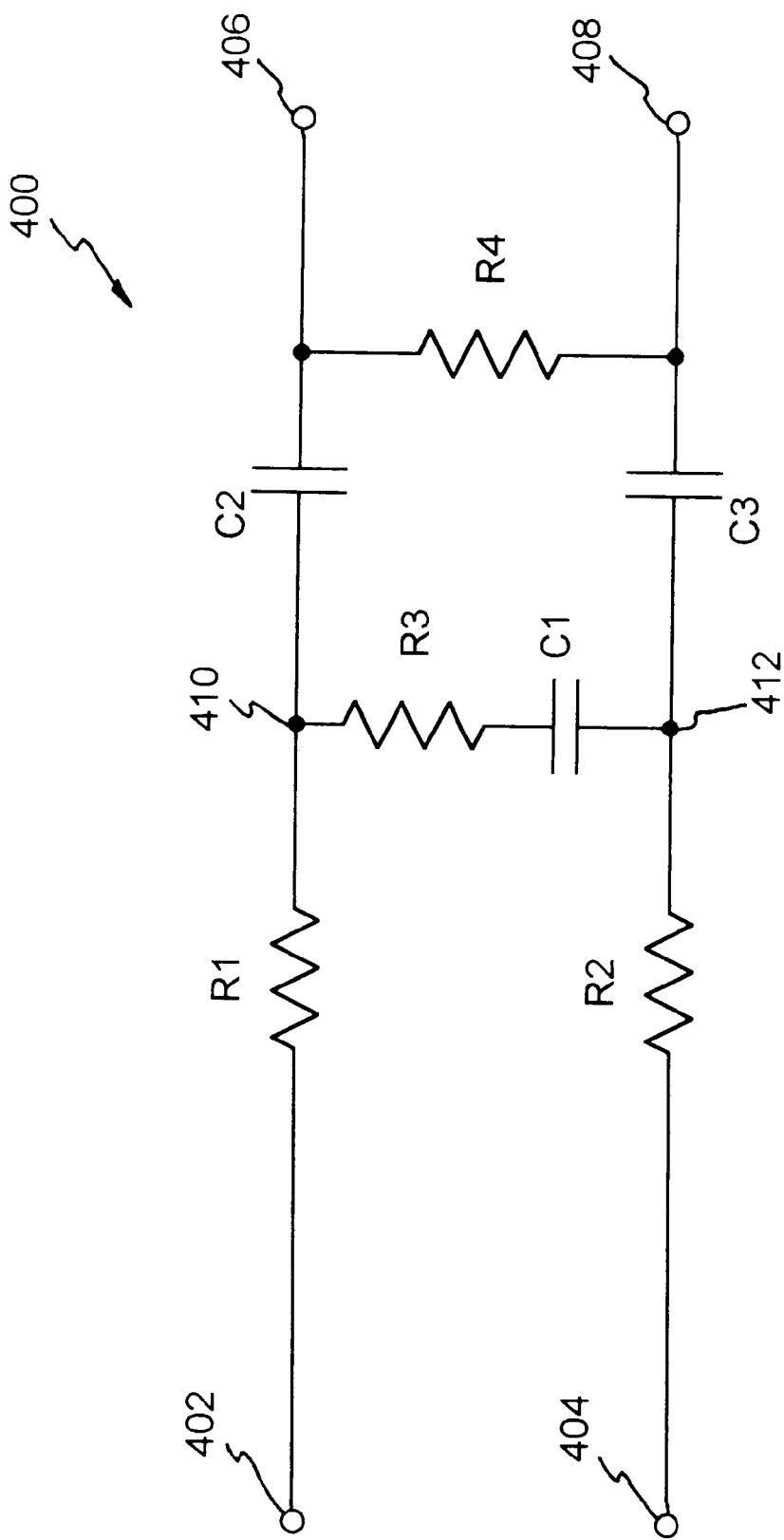
FIG. 4 is a schematic diagram illustrating a first embodiment of a baseline shift correction network which can be used in data storage systems and apparatus of the present invention.

FIG. 4 is a schematic illustration of a preferred embodiment of baseline shift correction network 140. Circuit 400 is an inexpensive and highly effective manner in which to implement baseline shift correction network 140 to remove baseline shift from the read back signal. Circuit 400 includes differential inputs 402 and 404 which correspond to inputs 142 and 144 in FIG. 1. Circuit 400 also includes differential outputs 406 and 408 which correspond to outputs 146 and 148 of baseline shift correction network 140 illustrated in FIG. 1.

Between inputs 402 and 404 and outputs 406 and 408, circuit 400 includes resistors R1, R2, R3 and R4, and capacitors C1, C2 and C3. Resistor R1 is connected between input 402 and node 410. Resistor R2 is connected between input 404 and node 412. Capacitor C2 is connected between node 410 and output 406. Capacitor C3 is connected between node 412 and output 408. Between nodes 410 and 412, resistor R3 and capacitor C1 are connected in series. Resistor R4 is connected across outputs 406 and 408.

Capacitors C2 and C3 and resistor R4 correspond to the coupling zero and coupling pole existing in conventional disc drive data storage systems which have the preamplifier capacitively coupled to the channel IC. If desired, circuit 400 can be designed such that the resistance provided by resistor R4 is provided by the input resistance of the channel IC. In this instance, resistor R4 can be eliminated. The values of the components of circuit 400 are selected from a wide variety of possible values in order to implement the transfer function of Equation 1.

Figure 5:
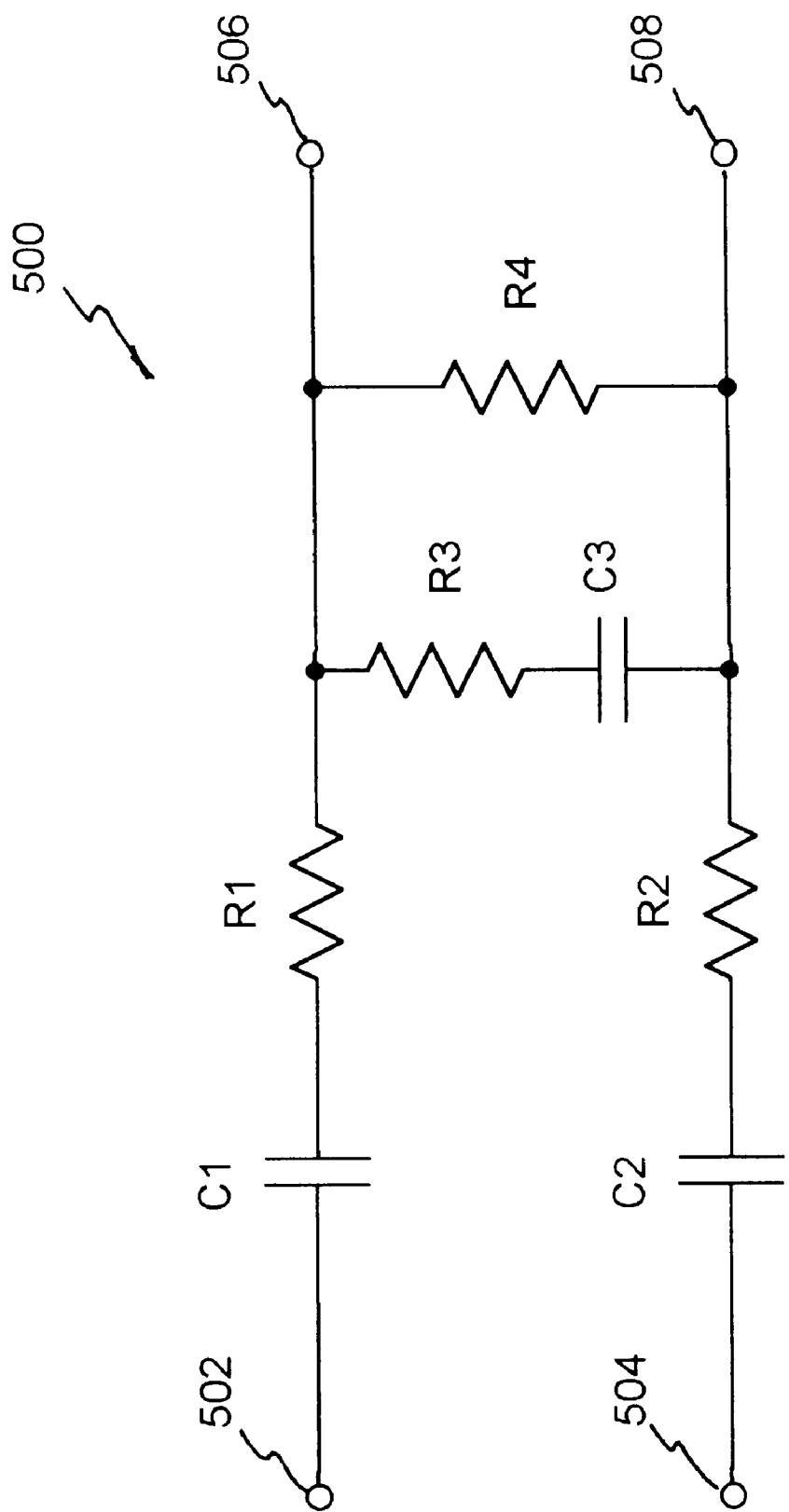
FIG. 5 is a schematic diagram illustrating an alternate embodiment of a baseline shift correction network which can be used in data storage systems and apparatus of the present invention.

FIG. 5 is a schematic diagram of circuit 500 which is one of numerous possible alternate embodiments of baseline shift correction network 140. Circuit 500 includes inputs 502 and 504 which correspond to inputs 142 and 144 of network 140. Circuit 500 also includes outputs 506 and 508 which correspond to outputs 146 and 148 of network 140. Circuit 500 includes resistors R1, R2, R3 and R4 and capacitors C1, C2, and C3.

Capacitor C1 and resistor R1 are connected in series between input 502 and output 506. Capacitor C2 and resistor R2 are connected in series between input 504 and output 508. Resistor R3 and capacitor C3 are connected in series across outputs 506 and 508. In parallel to resistor R3 and capacitor C3, resistor R4 is also connected across outputs 506 and 508.

The present invention can be summarized in reference to FIG. 1 in which a data storage apparatus 100 is disclosed. The present invention can also be described with reference to disc drive data storage systems. The data storage apparatus includes a transducer 120 which provides a read back signal. A correction network 140, operably coupled to the transducer 120, removes baseline shift from the read back signal and provides as an output a corrected read back signal.

Data storage apparatus 100 can also include a channel IC 150, operably coupled to the correction network 140, which receives the corrected read back signal. The channel IC 150 detects transition levels in the read back signal and provides in response a channel IC output which is indicative of the data stored on the media surface 115.

In some embodiments of the present invention, the correction network 140 is adapted to remove baseline shift from the read back signal at virtually all data rates associated with the read back signal. In some embodiments of the present invention, the correction network 140 removes baseline shift from the read back signal by applying to the read back signal a transfer function having the term:

$$\frac{S + (A \cdot 10^6)}{S + (B \cdot 10^6)}$$

where the variable A has a value between approximately 10 and approximately 50, and wherein the variable B has a value between approximately 1 and approximately 10. In more particular embodiments, the variable A is approximately equal to 16 the variable B is approximately equal to 6. In some embodiments, the transfer function applied to the read back signal by the correction network 140 further includes the term:

$$\frac{S}{S + (3 \cdot 10^6)}$$

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is at times described as a disc drive data storage system, it will be appreciated by those skilled in the art that the teachings of the present invention can be applied to other systems and apparatus, such as optical storage systems and tape drives, without departing from the scope and spirit of the present invention. Further, while implementation of the baseline shift correction network used in data storage systems of the present invention has been described with respect to particular circuit configurations, those skilled in the art will recognize that other circuit configurations can be used as well. For example, the transfer function implemented by the baseline shift correction network can be realized using other types of components such as inductors, active circuits, or new design techniques in the IC itself.

Although the present invention has been described with reference to preferred embodiments, workers skilled in the art will recognize that changes may be made in form and detail without departing from the spirit and scope of the invention.

What is claimed is:

1. A data storage apparatus comprising:

a transducer providing a read back signal having continuous baseline shift and a plurality of data rates associated therewith;

a correction network, operably coupled to the transducer and continuously receiving the read back signal, which continuously removes baseline shift from the read back signal and provides as an output a corrected read back signal by continuously applying a linear filter transfer function to the read back signal, wherein the correction network is adapted to remove baseline shift from the read back signal at each of the plurality of data rates associated with the read back signal by applying to the read back signal a transfer function having the term:

$$\frac{S + (A \cdot 10^6)}{S + (B \cdot 10^6)}$$

where the variable A has a value between approximately 10 and approximately 50, and wherein the variable B has a value between approximately 1 and approximately 10; and a channel integrated circuit (IC) operably coupled to the correction network to detect transition levels in the read back signal and to generate in response a channel IC output which is indicative of data stored on a media surface.

2. The data storage apparatus of claim 1, wherein the variable A is approximately equal to 16, and wherein the variable B is approximately equal to 6.

3. The data storage apparatus of claim 2, wherein the transfer function applied to the read back signal by the correction network further includes the term:

$$\frac{S}{S + (3 \cdot 10^6)}$$

4. The data storage apparatus of claim 3, wherein the media surface is a magnetic media surface and wherein the transducer is a magnetoresistive transducer.

5. A disc drive data storage system for retrieving data stored on a surface of a magnetic disc, the disc drive data storage system comprising:

a magnetoresistive (MR) transducer positioned adjacent the surface of the magnetic disc and providing a differential data signal indicative of the data stored on the surface of the magnetic disc, the differential data signal continuously exhibiting baseline shift;

a preamplifier, operably coupled to the MR transducer, which provides an amplified differential data signal continuously exhibiting baseline shift;

baseline shift removing circuitry, operably coupled to the preamplifier and receiving the amplified differential data signal, which continuously removes baseline shift from the amplified differential data signal and provides a corrected differential data signal having baseline shift substantially removed by continuously applying a linear filter transfer function to the amplified differential data signal, the baseline shift removing circuitry removing the baseline shift from the amplified differential data signal by applying to the amplified differential data signal a transfer function including the term:

$$\frac{S+(A \cdot 10^6)}{S+(B \cdot 10^6)}$$

where the variable A has a value between approximately 10 and approximately 50, and wherein the variable B has a value between approximately 1 and approximately 10; and a channel integrated circuit (IC) operably coupled to the baseline shift removing circuitry, which detects transitions in the corrected differential data signal and provides in response a channel IC output signal indicative of data states of bits of information stored on the surface of the magnetic disc.

6. The disc drive data storage system of claim 5, wherein the variable A is approximately equal to 16, and wherein the variable B is approximately equal to 6.

7. The disc drive data storage system of claim 6, wherein the transfer function applied to the amplified differential data signal by the baseline shift removing circuitry further includes the term:

$$\frac{S}{S+(3 \cdot 10^6)}$$

8. A disc drive comprising:
a magnetic disc having data stored on a surface thereof;
a magnetoresistive (MR) transducer positioned adjacent the surface of the magnetic disc and providing a read back signal, having a plurality of data rates associated therewith, indicative of the data stored on the surface of the magnetic disc, the read back signal continuously exhibiting baseline shift such that portions of the read back signal are above or below a baseline value of the read back signal;
a preamplifier receiving the read back signal and providing in response an amplified read back signal exhibiting baseline shift;
baseline shift compensation circuitry, operably coupled to the preamplifier, which continuously adjusts the amplified read back signal to thereby minimize portions of the amplified read back signal above or below the baseline value at each of the plurality of data rates, the baseline shift compensation circuitry providing a compensated read back signal having baseline shift substantially removed by continuously applying to the amplified read back signal a linear filter transfer function including the term:

$$\frac{S+(A \cdot 10^6)}{S+(B \cdot 10^6)}$$

where the variable A has a value between approximately 10 and approximately 50, and wherein the variable B has a value between approximately 1 and approximately 10.

9. The disc drive of claim 8, and further comprising a channel integrated circuit (IC), operably coupled to the baseline shift compensation circuitry, which receives the compensated read back signal and detects transition levels in the compensated read back signal and providing in response a channel IC output signal indicative of data states of bits of information stored on the surface of the magnetic disc.

10. The disc drive of claim 8, wherein the variable A is approximately equal to 16, and wherein the variable B is approximately equal to 6.

* * * * *